United States Patent
Hu et al.

(10) Patent No.: US 10,461,525 B2
(45) Date of Patent: Oct. 29, 2019

(54) FAULT CURRENT LIMITING CONTROL AND PROTECTION COORDINATION METHOD FOR CONVERTER OF FLEXIBLE DIRECT CURRENT POWER TRANSMISSION SYSTEM OPERATING IN ISLANDING STATE

(71) Applicants: NR ELECTRIC CO., LTD, Jiangsu (CN); NR ENGINEERING CO., LTD, Jiangsu (CN)

(72) Inventors: Zhaoqing Hu, Jiangsu (CN); Yunlong Dong, Jiangsu (CN); Ke Wang, Jiangsu (CN); Haiying Li, Jiangsu (CN); Dongming Cao, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/336,064

(22) PCT Filed: Aug. 18, 2017

(86) PCT No.: PCT/CN2017/098042
§ 371 (c)(1),
(2) Date: Mar. 22, 2019

(87) PCT Pub. No.: WO2018/076904
PCT Pub. Date: May 3, 2018

(65) Prior Publication Data
US 2019/0260201 A1 Aug. 22, 2019

(30) Foreign Application Priority Data
Oct. 31, 2016 (CN) .......................... 2016 1 0938897

(51) Int. Cl.
 *H02H 7/26* (2006.01)
 *H02M 1/32* (2007.01)
 *H02J 3/36* (2006.01)

(52) U.S. Cl.
 CPC ................. *H02H 7/26* (2013.01); *H02J 3/36* (2013.01); *H02M 1/32* (2013.01)

(58) Field of Classification Search
 CPC ............... H02H 7/26; H02J 3/36; H02M 1/32
 (Continued)

(56) References Cited

U.S. PATENT DOCUMENTS 5,929,538 A * 7/1999 O'Sullivan ........... H02J 7/1415
307/44
2009/0303761 A1* 12/2009 Radbrant .................. H02J 3/36
363/51

(Continued)

FOREIGN PATENT DOCUMENTS

CN 103138384 A 6/2013
CN 103904677 A 7/2014
(Continued)

OTHER PUBLICATIONS

ISA/CN, International Search Report dated Nov. 21, 2017, International Application No. PCT/CN2017/098042, 4 pages with English translation.

(Continued)

Primary Examiner — Kevin J Comber
(74) Attorney, Agent, or Firm — Masuvalley & Partners

(57) ABSTRACT

A fault current limiting control and protection coordination method for a converter of a flexible direct current transmission system operating in an islanding state is provided. The current output command limit Imax is used to limit the current commands of inner loop currents, and in the event of (Continued)

a fault, Imax is set equal to or slightly larger than a value for an AC line overcurrent protection section.

10 Claims, 1 Drawing Sheet

(58) Field of Classification Search
USPC .......................................................... 361/63
See application file for complete search history.

(56) References Cited

U.S. PATENT DOCUMENTS

| | | | | |
|---|---|---|---|---|
| 2012/0309242 A1* | 12/2012 | Haugland | ............. | B63H 21/20 440/3 |
| 2014/0103727 A1* | 4/2014 | Taimela | .................... | H02J 3/24 307/76 |
| 2014/0191507 A1* | 7/2014 | Holmberg | ................. | H02J 3/36 290/44 |
| 2014/0247629 A1* | 9/2014 | Crane | ....................... | H02J 3/36 363/35 |
| 2018/0145499 A1* | 5/2018 | Gupta | ...................... | H02H 3/16 |
| 2018/0219380 A1* | 8/2018 | Dong | ......................... | H02J 3/36 |

FOREIGN PATENT DOCUMENTS

| | | |
|---|---|---|
| CN | 104485683 A | 4/2015 |
| CN | 104617572 A | 5/2015 |
| CN | 105870967 A | 8/2016 |

OTHER PUBLICATIONS

Taoxi Zhu et al., "Influence of AC System Fault on HVDC System and Improvement Suggestions", Automation of Electric Power Systems 2009 33(1), Jan. 10, 2009, 6 pages.

* cited by examiner

FAULT CURRENT LIMITING CONTROL AND PROTECTION COORDINATION METHOD FOR CONVERTER OF FLEXIBLE DIRECT CURRENT POWER TRANSMISSION SYSTEM OPERATING IN ISLANDING STATE

RELATED APPLICATIONS

This application is the U.S. National Phase of and claims priority to International Patent Application No. PCT/CN2017/098042, International Filing Date Aug. 18, 2017; which claims benefit of Chinese Patent Application No. 201610938897.1 filed Oct. 31, 2016; both of which are incorporated herein by reference in their entireties.

FIELD OF THE INVENTION

The present invention belongs to the field of direct current transmission, and particularly relates to a fault current limiting control and protection coordination method for a converter of a flexible direct current transmission system operating in an islanding state.

BACKGROUND OF THE INVENTION

The voltage source converter based high voltage direct current (VSC-HVDC) uses a power electronic device that can be turned-off, and it can commutated without the need for an external power supply, thus providing the ability to supply power to a passive grid. In the operation of the power grid, in order to enhance the reliability of power supply for important loads, two-way power supply, i.e., flexible DC and AC lines, can be used to supply power to the important loads. Under normal circumstances, the two-way are used to supply power. In special cases, the power is supplied by a flexible DC or AC line. When the flexible DC power supply mode is adopted, in the case of a failure on the AC side, the AC protection trips the faulty line to remove the fault, and the flexible DC system continues to operate. However, in special cases, the flexible DC system does not coordinate with the AC protection, and there is no current limiting measure in the case of flexible DC islanding operation, which may cause that the flexible DC first trips out in the case of a fault outside the flexible DC system, the AC protection does not act or delays the action, and the flexible DC converter instantaneous overload and output current limiting capability are not fully utilized to form the coordination between AC and DC protection. AC protection generally includes overcurrent protection section I, II or III. The flexible DC converter has bridge arm overcurrent protection section I, II or III. By setting coordination between the AC and DC overcurrent protection with set values, in the case of a fault outside the converter, the current limiting capability of the converter can be utilized to achieve a given output current level in the event of the fault, and a partial short-circuit current is provided. In this case, the AC protection can be used to remove the fault, and on the other hand, the converter operation is not affected in the case of the fault.

According to a patent entitled "A Smooth Switching Method for Flexible DC Transmission System from Parallel Operation to Islanding Operation", Chinese application number 201310220297.8, detecting flexible DC transmission system operated in AC/DC parallel operation mode or islanding operation mode by system electrical quantity change characteristics, and after determining that the system is working in islanding operation mode, the control mode is automatically switched to the corresponding control strategy, but there is no description of the coordination with AC protection in the case of a fault in islanding operation mode. "MMC-HVDC Networking and Islanding Operation State Transition Strategy", 2015, 35 (9): 2152-2161, describes a stable switching strategy between a networked state and an islanding state of the flexible DC system, but does not involve a control current limiting method and AC system protection coordination mode under the protection fault.

SUMMARY OF THE INVENTION

The object of the present invention is to provide a fault current limiting control and protection coordination method for a converter of a flexible direct current transmission system operating in an islanding state, wherein the converter output current command limit Imax is used to limit the current commands $I^*_{Ldq}$ of inner loop dq currents, and in the event of the fault of AC system, Imax is set equal to or slightly larger than a value for an AC line overcurrent protection section III. The set value for AC line overcurrent protection section I is smaller than the set value for converter bridge arm overcurrent protection section I; the value for proximal AC line overcurrent protection section II is less than or equal to the value for converter bridge arm overcurrent protection section II, and under such condition, the delay is longer than the AC line overcurrent protection section II. At the time of detecting a fault on the connected line side of the converter, the value for current output command limit Imax of the converter is changed from the allowable multiple of output current of the converter under normal condition to the value for the AC line protection section III in the event of fault. Partial short circuit current is provided by limiting the output current of the converter, the AC fault is removed by AC protection section III without affecting the normal operation of the converter. After the AC side fault is removed, Imax is restored to an allowable multiple of output current of the converter under normal condition. The method of switching Imax is that: pre-setting a series or curve of n groups of two-dimensional numerical values $(U_{Lj}, Imaxj)$ (j=1, 2, ... n) according to the magnitude of voltage by detecting the magnitude of the voltage on the grid side in real time, the limit current command value Imax is obtained by using interpolation or lookup table method, to limit the output current value of the converter operating in passive state.

The above method detects the magnitude of the voltage on the grid side in real time. Once a low voltage state is detected, it is determined that a AC line fault occurs, Imax is changed from the allowable multiple of output current of the converter under normal condition to the value for the AC line protection section III in the event of fault.

According to the above-mentioned fault current limiting control and protection coordination method for a converter of a flexible direct current transmission system operating in an islanding state, when a grid side fault of the converter disappears, the current command limit Imax is restored to the allowable multiple of output current of the converter under normal condition, and a criterion for determining that the grid side fault disappears is $U_L$>Uset, wherein Uset is a preset AC voltage threshold.

According to the above-mentioned fault current limiting control and protection coordination method for a converter of a flexible direct current transmission system operating in an islanding state, due to an outer loop integration control of the grid-side voltage, the current command is quickly brought to the limit Imax under low voltage conditions, which is beneficial to the output current of converter rapidly reaching the value for AC line protection section II or section III in the event of the fault.

According to the above-mentioned fault current limiting control and protection coordination method for a converter of a flexible direct current transmission system operating in an islanding state, the Imax ranges from 0.0 to 1.5 under normal condition and fault condition, and the Imax under fault condition is generally smaller than that under normal condition.

According to the above-mentioned fault current limiting control and protection coordination method for a converter of a flexible direct current transmission system operating in an islanding state, a series or curve of n groups of two-dimensional numerical values $(U_{Lj}, Imaxj)$ (j=1, 2, ... n) is pre-set, wherein $U_L$ is the grid side voltage; the method of switching Imax from the allowable current multiple of the converter under normal condition to the value for AC line protection section II or section III under fault condition is to obtain the limit value Imax using interpolation or lookup table method according to the current detected value of $U_{Lj}$.

According to the above-mentioned fault current limiting control and protection coordination method for a converter of a flexible direct current transmission system operating in an islanding state, the current limit command $I^*_{Ldq\_LIM}$ is used as an input current command of inner loop current controller.

According to the above-mentioned fault current limiting control and protection coordination method for a converter of a flexible direct current transmission system operating in an islanding state, in the event of AC line fault, the Imax current command is used, if the actual output current is smaller than Imax, the system continues to operate; if $\sqrt{I^{*2}_{Ld\_LIM}+I^{*2}_{Lq\_LIM}}=I_{max}$ is satisfied, after using the external AC protection section II or section III to remove the AC fault, Imax is restored to an allowable multiple of output current of the converter under normal condition.

According to the above-mentioned fault current limiting control and protection coordination method for a converter of a flexible direct current transmission system operating in an islanding state, the current output command limit Imax is used to limit the current commands $I^*_{Ldq}$ of inner loop dq currents, if current limit commands are detected as $\sqrt{I^{*2}_{Ld}+I^{*2}_{Lq}}>I_{max}$, the current inner loop output current commands $i^*_{Ld}$ and $i^*_{Lq}$ are changed in an equal proportion to obtain $i^*_{Ldq\_LIM}$, wherein $\sqrt{I^{*2}_{Ld\_LIM}+I^{*2}_{Lq\_LIM}}=I_{max}$ is satisfied, while the angle between current commands of dq currents is unchanged.

After adopting the above scheme, the beneficial effects of the present invention are:

(1) Make full use of the instantaneous overload of the DC converter and the output current limiting capability to form the coordination between the AC and DC protection, the converter can be used to limit the output current to achieve a given current in the event of fault, and provide a partial short-circuit current. On the one hand, the fault can be removed by AC protection, and on the other hand, it does not affect the operation of the converter under fault conditions.

(2) Through the coordination between the flexible DC converter bridge arm overcurrent protection and the AC protection, the proximal fault is quickly removed by the quick action of AC line protection section I, and the converter bridge arm overcurrent protection coordinates with the distal line protection, as the far backup of the distal line protection operating in islanding, the converter overload capability can be fully utilized, and the converter continues to operate after the distal fault is removed.

DETAILED DESCRIPTION OF THE EMBODIMENTS

Figure 1:
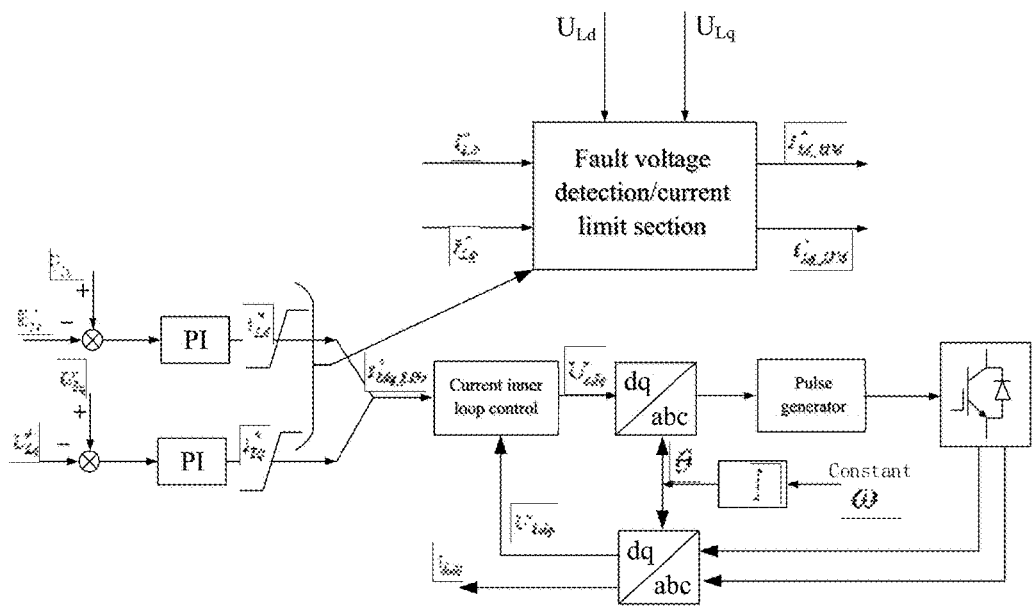
FIG. 1 is a converter current limiting control scheme for passive operation of the converter.

The object of the present invention is to provide a fault current limiting control and protection coordination method for a converter of a flexible direct current transmission system operating in islanding state. When the converter is connected to an AC system working in islanding state, in the event of an AC system fault, partial short circuit current is provided by limiting the output current of the converter, and the corresponding output of converter is switched according to the detected current AC voltage amplitude, and the AC line fault is removed by AC protection without affecting the normal operation of the converter. After the AC side fault is removed, Imax is restored to an allowable multiple of output current of the converter under normal condition.

In order to achieve the above object, the solution of the present invention is:

A value of an output current of the converter coordinates with set values of the AC line overcurrent protection action. The coordination mode is that, once the fault of the connected AC system is detected, the current output command limit Imax for the converter is set equal to or slightly larger than a value for an AC line overcurrent protection section III. The set value for the AC line overcurrent protection section I is smaller than the set value for the converter bridge arm overcurrent protection section I. The converter bridge arm overcurrent protection section I is set considering an instantaneous overload capability of the converter.

The set value for the proximal AC line overcurrent protection section II is larger than the set value for the converter bridge arm overcurrent protection section II, and the delay is shorter than the converter bridge arm overcurrent protection section II. The converter bridge arm overcurrent protection section II works as backup, the set value for the distal AC line overcurrent protection is smaller than the set value for the converter bridge arm overcurrent protection section II, and the converter bridge arm overcurrent protection section II is used as remote backup.

The set value for the AC line overcurrent protection section III is set to the output command limit Imax for the converter in the event of a fault. Imax is also the current limit value at which the converter is capable of operating for a long time in the event of the fault. The delay for the AC line overcurrent protection section III is shorter than that of the converter bridge arm overcurrent protection section III, and the converter bridge arm overcurrent protection section III is used as a remote backup for distal AC line.

The control system detects the magnitude of the voltage on grid side in real time. Once a low voltage state is detected, it is considered that the AC line is faulty. Imax is changed from the allowable multiple of output current of the converter under normal condition to the value for the AC line protection section III in the event of fault. When a grid side fault of the converter disappears, the current command limit Imax is restored to the allowable multiple of output current of the converter under normal condition, and a criterion for determining that the grid side fault disappears is $U_L$>Uset, wherein Uset is a preset AC voltage threshold.

Imax is used to limit the current commands $I^*_{Ldq}$ of inner loop dq currents. If current limit commands are detected as $\sqrt{I^{*}_{Ld}{}^2 + I^{*}_{Lq}{}^2} > I_{max}$, the current inner loop output current commands $i^*_{Ld}$ and $i^*_{Lq}$ are changed in an equal proportion to obtain $i^*_{Ldq\_LIM}$, wherein $\sqrt{I^{*}_{Ld\_LIM}{}^2 + I^{*}_{Lq\_LIM}{}^2} = I_{max}$ is satisfied, while the angle between current commands of dq currents is unchanged, and the above obtained current limit command $i^*_{Ldq\_LIM}$ acts as an input current command of inner loop current controller.

The AC voltage is used as a control input of outer loop PI. As shown in FIG. 1, due to an outer loop integration control of the grid-side voltage, the current command is quickly brought to the limit Imax under low voltage conditions, which is beneficial to the output current of converter rapidly reaching the value for AC line protection section II or section III in the event of the fault. The Imax ranges from 0.0 to 1.5 under normal condition and fault condition, and the Imax under fault condition is generally smaller than that under normal condition.

Figure 2:
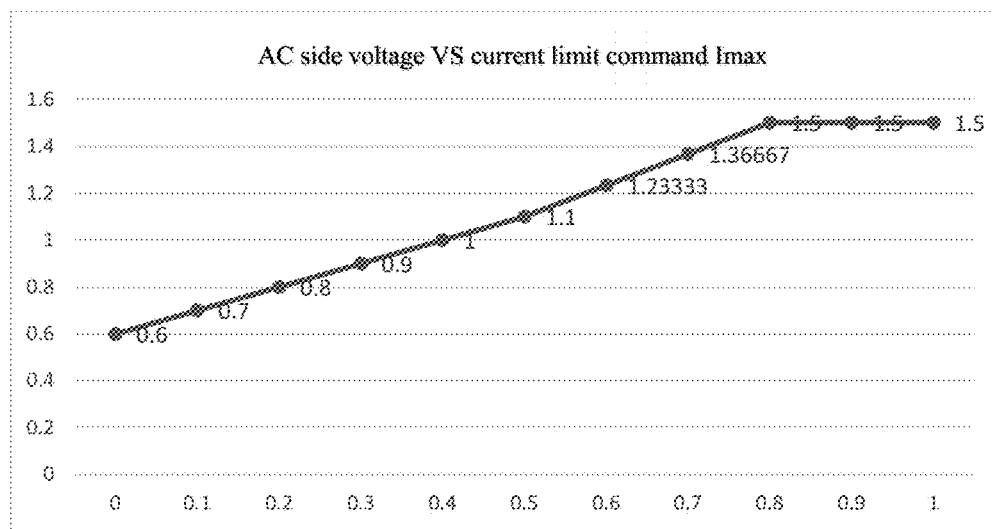
FIG. 2 is a graph showing the relationship of the inner loop current limit Imax of the converter according to AC voltage $U_L$.

The method of switching from Imax under normal condition to Imax under fault condition is shown in FIG. 2: pre-setting a series or curve of n groups of two-dimensional numerical values $(U_{Lj}, I_{maxj})$ (j=1, 2, . . . n), $U_L$ is the grid side voltage, the method of switching Imax from the allowable current multiple of the converter under normal condition to the value for AC line protection section III under fault condition is to obtain the limit value Imax using interpolation or lookup table method according to the current detected value of $U_{Lj}$.

In the event of AC line fault, the Imax current command is used, if the actual output current is smaller than Imax, the system continues to operate. If $\sqrt{I^{*}_{Ld\_LIM}{}^2 + I^{*}_{Lq\_LIM}{}^2} = I_{max}$ is satisfied, after using the external AC protection section II or section III to remove the AC fault, Imax is restored to an allowable multiple of output current of the converter under normal condition.

The invention claimed is:

1. A fault current limiting control and protection coordination method for a converter of a flexible direct current transmission system operating in an islanding state, characterized in that: coordinating a value of an output current of the converter with a set operating value for an AC line overcurrent protection, wherein:
   once a fault of a connected AC system is detected, a current output command limit Imax for the converter is set equal to or not more than 1.5 times a value for an AC line overcurrent protection section III; a set value for an AC line overcurrent protection section I is set smaller than a set value for a converter bridge arm overcurrent protection section I; the converter bridge arm overcurrent protection section I is set considering an instantaneous overload capability of the converter; a set value for a proximal AC line overcurrent protection section II is set larger than a set value for a converter bridge arm overcurrent protection section II, and a delay for the proximal AC line overcurrent protection section II is shorter than a delay for the converter bridge arm overcurrent protection section II and the converter bridge arm overcurrent protection section II works as a backup; a set value for a distal AC line overcurrent protection section II is set smaller than the set value for the converter bridge arm overcurrent protection section II, and the converter bridge arm overcurrent protection section II is used as a remote backup.

2. The fault current limiting control and protection coordination method for the converter of the flexible direct current transmission system operating in the islanding state according to claim 1, characterized in that: a set value for an AC line overcurrent protection section III is set to the output command limit Imax for the converter in the event of a fault; Imax is also a current limit value at which the converter is capable of operating for a long time in the event of the fault; a delay for the AC line overcurrent protection section III is shorter than a delay for a converter bridge arm overcurrent protection section III, and the converter bridge arm overcurrent protection section III is used as a remote backup for a distal AC line.

3. The fault current limiting control and protection coordination method for the converter of the flexible direct current transmission system operating in the islanding state according to claim 1, characterized in that: a magnitude of a grid-side voltage is detected in real time, and once a low voltage state is detected, it is determined that a AC line fault occurs, and Imax is changed from an allowable multiple of output current of the converter under normal condition to the value for the AC line overcurrent protection section III in the event of the fault.

4. The fault current limiting control and protection coordination method for the converter of the flexible direct current transmission system operating in the islanding state according to claim 1, characterized in that: due to an outer loop integration control of a grid-side voltage, when a grid side fault of the converter disappears, the current command limit Imax is restored to the allowable multiple of output current of the converter under normal condition, and a criterion for determining that the grid side fault disappears is $U_L$>Uset, wherein Uset is a preset voltage threshold.

5. The fault current limiting control and protection coordination method for the converter of the flexible direct current transmission system operating in the islanding state according to claim 1, characterized in that: due to an outer loop integration control of a grid-side voltage, a current command is quickly brought to the current output command limit Imax under low voltage conditions, facilitating a rapid increase of the output current of the converter to the values of the AC line overcurrent protection section II or section III in the event of the fault.

6. The fault current limiting control and protection coordination method for the converter of the flexible direct current transmission system operating in the islanding state according to claim 1, characterized in that: the Imax ranges from 0.0 to 1.5 pu under normal condition and fault condition, and the Imax under fault condition is generally smaller than the Imax under normal condition.

7. The fault current limiting control and protection coordination method for the converter of the flexible direct current transmission system operating in the islanding state according to claim 3, characterized in that: a series or curve of n groups of two-dimensional numerical values $(U_{Lj}, I_{maxj})$ (j=1, 2, . . . n) is pre-set, wherein $U_L$ is the grid-side voltage; and changing Imax from the allowable multiple of output current of the converter under normal condition to the value for the AC line overcurrent protection section III or a value for the AC line overcurrent protection section II in the event of the fault comprises obtaining the limit Imax using interpolation or lookup table method according to the detected $U_{Lj}$.

8. The fault current limiting control and protection coordination method for the converter of the flexible direct current transmission system operating in the islanding state according to claim 1, characterized in that: a current limit command $i^*_{Ldq\_LIM}$ is used as an input current command of an inner loop current controller.

9. The fault current limiting control and protection coordination method for the converter of the flexible direct current transmission system operating in the islanding state according to claim 1, characterized in that: in the event of an AC line fault, the current command limit Imax is applied, if an actual output current is smaller than Imax, the system continues to operate; if $\sqrt{I^*_{Ld\_LIM}{}^2 + I^*_{Lq\_LIM}{}^2} = I_{max}$ is satisfied, after using the external AC line overcurrent protection section II or section III to remove the AC line fault, Imax is restored to an allowable multiple of output current of the converter under normal condition.

10. The fault current limiting control and protection coordination method for the converter of the flexible direct current transmission system operating in the islanding state according to claim 1, characterized in that: the current output command limit Imax is used to limit the current commands $I^*_{Ldq}$ of inner loop dq currents, if current commands are detected as $\sqrt{I^*_{Ld\_}{}^2 + I^*_{Lq}{}^2} > I_{max}$, the current inner loop output current commands $i^*_{Ld}$ and $i^*_{Lq}$ are changed in an equal proportion to obtain $i^*_{Ldq\_LIM}$, wherein $\sqrt{I^*_{Ld\_LIM}{}^2 + I^*_{Lq\_LIM}{}^2} = I_{max}$ is satisfied, while the angle between current commands of dq currents is unchanged.

* * * * *